April 13, 1965    H. R. LAWRENCE    3,177,651
LASER IGNITION
Filed Jan. 18, 1962
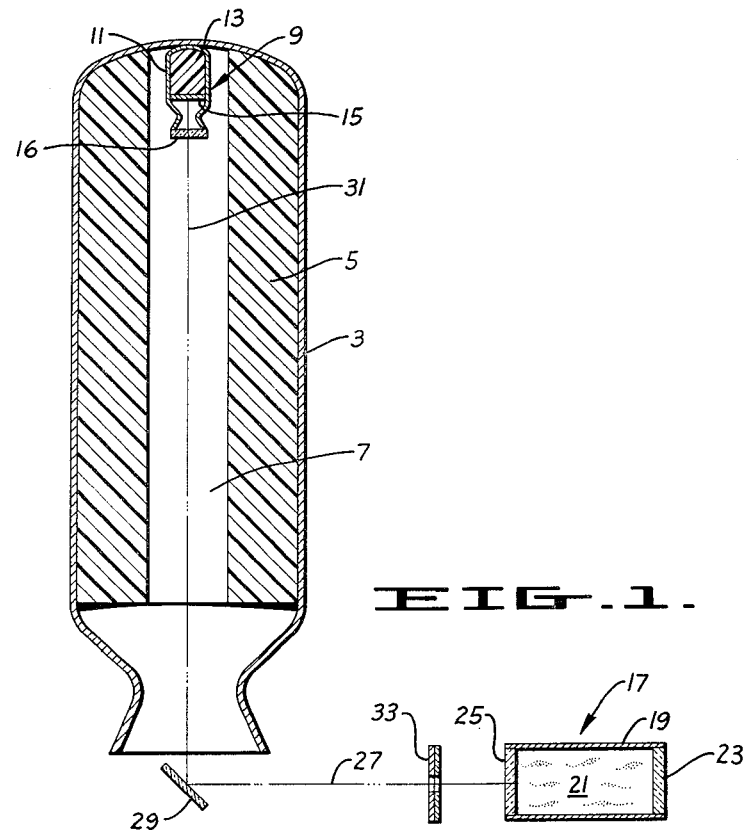
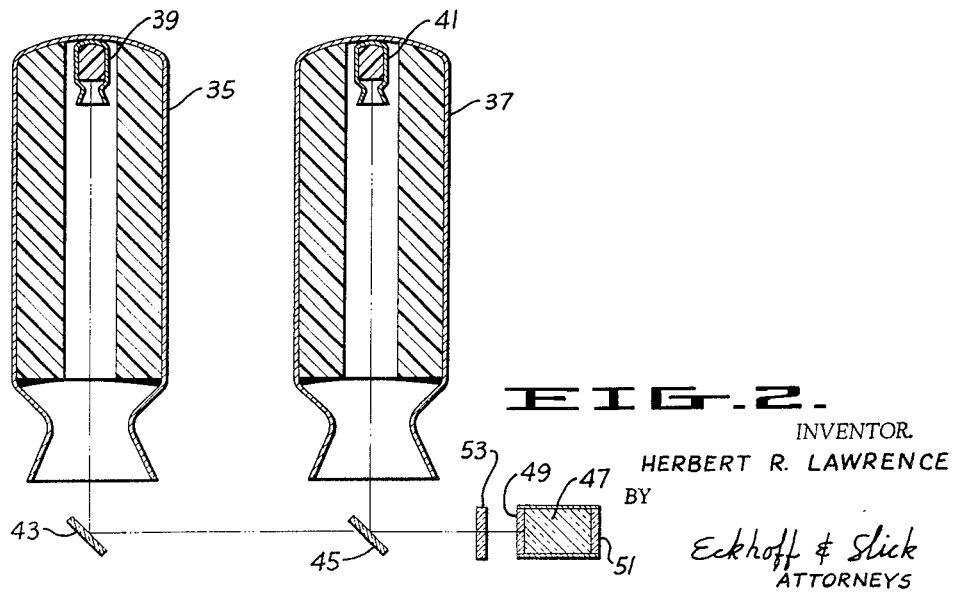
INVENTOR.
HERBERT R. LAWRENCE
BY
Eckhoff & Slick
ATTORNEYS

United States Patent Office 3,177,651
Patented Apr. 13, 1965

3,177,651
LASER IGNITION
Herbert R. Lawrence, Atherton, Calif., assignor to United Aircraft Corporation, a corporation of Delaware
Filed Jan. 18, 1962, Ser. No. 167,022
5 Claims. (Cl. 60—35.3)

This invention relates to a novel method of igniting a rocket engine and more particularly relates to a method of igniting a rocket engine using a laser or optical maser.

Heretofore rocket engines have ordinarily been ignited by means which include physical contact with electric wires. According to the present invention the difficulties and uncertainties of utilizing electric wiring are eliminated and also the device is insensitive to stray radiation which may cause premature ignition in some instances. Further, the previously employed systems have utilized some device inserted in the port of the engine, ordinarily from the forward end. This adds to the weight of the engine and weakens the casing.

The optical laser provides a source of coherent light of an intensity several orders of magnitude higher than any light source heretofore available. An outstanding characteristic of the light from a laser is not only its high intensity but also the fact that a plane wave can be propagated as essentially a parallel beam of radiation which spreads only through a defraction angle which is determined by the wave length of the radiation and the size and cross sectional shape as the source of the original wave front. Thus, the laser provides not only an essentially coherent light wave of high intensity but also one which can be propagated for long distances without loss of effectiveness. In accordance with the present invention, it is possible to ignite a rocket engine at distances of several miles from the launching site.

Another characteristic of the laser is that it is easy to determine the exact amount of energy which is produced so that extremely uniform results are achieved which is particularly important when tests are being made.

Another characteristic of the laser is the high intensity of the radiation so that ignition is substantially instantaneous so that a large number of rockets can be ignited at exactly the same time. This is highly advantageous in the firing of clustered engines.

The laser utilized in accordance with the present invention can be any well-known type such as that utilizing a crystal, such as ruby or a laser utilizing a gas mixture. Since the laser itself forms no part of the present invention, the laser has been indicated diagrammatically in the drawings.

It is an object of the present invention to provide a highly reliable system for the substantially instantaneous ignition of rocket engines which system can be operated at a long distance from the engine without wires and without being subject to the influence of stray electromagnetic radiation.

Another object of this invention is to provide an ignition system for rocket engines wherein no wires or other obstructions need be placed within the port of the engine and wherein the casing can be a solid piece without the necessity of weakening the casing in the insertion of an igniter at the head end of the engine.

Other objects will be apparent from the balance of the specification which follows.

In the drawings forming part of this application:

FIGURE 1 is a sectional view of a rocket engine ignition system embodying the present invention.

FIGURE 2 is similar to FIGURE 1 showing a similar method but adapted for the ignition of more than one engine simultaneously.

Turning now to the drawings by reference characters there is shown in FIGURE 1 a rocket engine 3 having a propellant grain 5 therein, said grain having a central burning port 7. Located within the port 7 is an igniter, generally designated 9 which is, in effect, a miniature rocket engine. The igniter 9 has a casing 11 having a solid propellant 13 therein such as a metallized polyurethane incorporating a solid oxidizer. Since such propellant mixtures are relatively difficult to ignite, the surface of the solid propellant 13 may be coated with a pyrotechnic 15, such as ordinary black powder. The laser itself, generally designated 17 may be a gas maser in which case a suitable container 19 is filled with a gas mixture 21 such as a mixture of helium and neon. The maser has two reflecting end plates, namely, a fully reflecting end 23 and a partially reflecting end 25. The means for pumping and pulsing the maser are well known to those skilled in the art and are not here shown. The beam 27 of the maser may be directed into the port of a rocket engine by means of a mirror 29. The reflected beam 31 impinges upon the black powder 15 igniting it. If desired, a shutter 33 may be provided in the beam as a safety precaution. Further, a band pass filter 16 may be provided in the path of the beam to prevent the possibility of ignition by stray light. Preferably this is located at the mouth of the igniter, as shown. The pulsing of the laser itself would be used for the firing.

In many instances, the shutter 33 may be placed relatively close to the rocket engine while the laser, or a low intensity light source simulating a laser, may be placed at a considerable distance from the rocket engine. Thus, the shutter may be closed and used at an aiming point in the initial alignment of the firing system.

In FIGURE 2 a method is shown whereby more than one engine can be fired simultaneously. In this embodiment of the invention engines 35 and 37, constructed as before with igniters 39 and 41 are provided with mirrows 43 and 45 opposite their ports. The mirror 45 might be a half-silvered mirror while the mirror 43 is a fully-silvered mirror. Here a ruby laser 47 might be employed with a partially reflective end 49 and a fully reflective end 51. By means of the two mirrors, the beam is split so that upon pulsing the laser, both engines are fired simultaneously. A filter 53 which is opaque to the laser beam may be employed in the beam path to eliminate the possibility of accidental ignition and to serve as an aiming point in lining up the system.

A further system, not illustrated, would employ a number of lasers, each laser being adapted to ignite one or more engines. A common power source could be used for all lasers in the system.

It is believed apparent from the foregoing that I have provided a novel system of high reliability for firing a rocket engine which obviates many of the difficulties heretofore encountered in the firing of such engines.

I claim:

1. The process of firing a plurality of rocket engines simultaneously, each of said engines having a rocket nozzle and an igniter therein, comprising forming a beam of coherent light, dividing said beam into a plurality of sub-beams and directing one of said sub-beams through the rocket nozzle and into the igniter of each of said engines whereby each of the engines is simultaneously ignited.

2. The method of igniting a solid propellant rocket engine, said engine having a closed head end and an open throat aft end with an igniter within the engine, comprising directing a laser beam through the throat of the engine onto the igniter of the engine whereby the rocket is ignited.

3. The method of igniting the propellant of a solid propellant rocket engine, said rocket engine having a rocket nozzle and an igniter associated therewith comprising directing a beam of high intensity coherent light through the rocket nozzle and into the igniter, thus actuating the igniter which in turn ignites the solid propellant of the rocket engine.

4. The method of claim 3 wherein a shutter is interposed in the beam.

5. The method of claim 3 wherein a band pass filter is interposed in the beam.

References Cited by the Examiner
UNITED STATES PATENTS

| | | | |
|---|---|---|---|
| D. 137,806 | 5/44 | Duescher | 88—39 |
| 1,390,258 | 9/21 | Geneste | 89—1 |
| 1,700,675 | 1/29 | Goddard | 60—26 |
| 2,515,048 | 7/50 | Lauritsen | 102—49 |

OTHER REFERENCES

"Rockets," October 1945, page 10 relied on.

"Lasers: Devices and Systems—Part 3," Electronics, Nov. 10, 1961, pages 81–85 relied on.

"Systems for Ignition of Solid Propellants" (Rabern), published by the American Rocket Society, 977–59, presented at the ARS 14th Annual Meeting, Nov. 16–20, 1959 (Figure 1 relied on).

"The Month in Science," Popular Science, pub. October 1960, pages 25 and 26 relied on.

Electronics, vol. 34, No. 47, Nov. 24, 1961 (pp. 54–57 relied on).

SAMUEL LEVINE, *Primary Examiner.*

SAMUEL FEINBERG, *Examiner.*